United States Patent [19]

Fischer

[11] 4,001,989
[45] Jan. 11, 1977

[54] APPARATUS FOR FIXING AN OBJECT TO A LOW-STRENGTH SUPPORT STRUCTURE

[76] Inventor: Artur Fischer, D-7241 Tumlingen Gde., Weinhalde 34, Waldachtal, Germany

[22] Filed: Oct. 15, 1975

[21] Appl. No.: 622,681

Related U.S. Application Data

[63] Continuation-in-part of Ser. No. 617,832, Oct. 1, 1975, which is a continuation-in-part of Ser. No. 616,072, Sept. 23, 1975.

[30] Foreign Application Priority Data

Oct. 30, 1974 Germany ............... 2451496

[52] U.S. Cl. .................... 52/127; 52/303; 52/743; 52/704
[51] Int. Cl.² ................ E04B 1/41; E04C 5/12
[58] Field of Search ........... 52/704, 743, 173, 617, 52/303, 127

[56] References Cited

UNITED STATES PATENTS

| 3,016,578 | 1/1962 | Rohe | 52/617 |
|---|---|---|---|
| 3,108,404 | 10/1963 | Lamb | 52/743 |
| 3,485,282 | 12/1969 | Lopez et al. | 52/617 |

*Primary Examiner*—James L. Ridgill, Jr.
*Attorney, Agent, or Firm*—Michael J. Striker

[57] ABSTRACT

A method and an apparatus for fixing an object to a low-strength support structure having interior cavities includes inserting an anchor member and an expandable element, which has an interior space and which is positioned about the anchor member, into an anchoring hole provided in the support structure. The expandable element has a closed end which encloses the leading end of the anchor member which, in turn, has an internal passage that extends from its leading end towards its trailing end and which communicates with the interior space of the expandable element. A device is inserted into the passage and ejects a hardenable substance under pressure into the passage and from there into the interior space so that a predetermined amount of the substance fills the space and forms a plug about the anchor member. The expandable element partially fills the cavity and fixes the anchor member securely in the anchoring hole upon the hardening of the substance. A flange is provided at the trailing end of the anchor member to seal the anchor hole against outflow of the hardenable substance therefrom. A sleeve member tightly engages an open end of the expandable element and prevents the same from becoming detached from the anchor member during the pressurized insertion of the substance into the expandable element.

6 Claims, 1 Drawing Figure

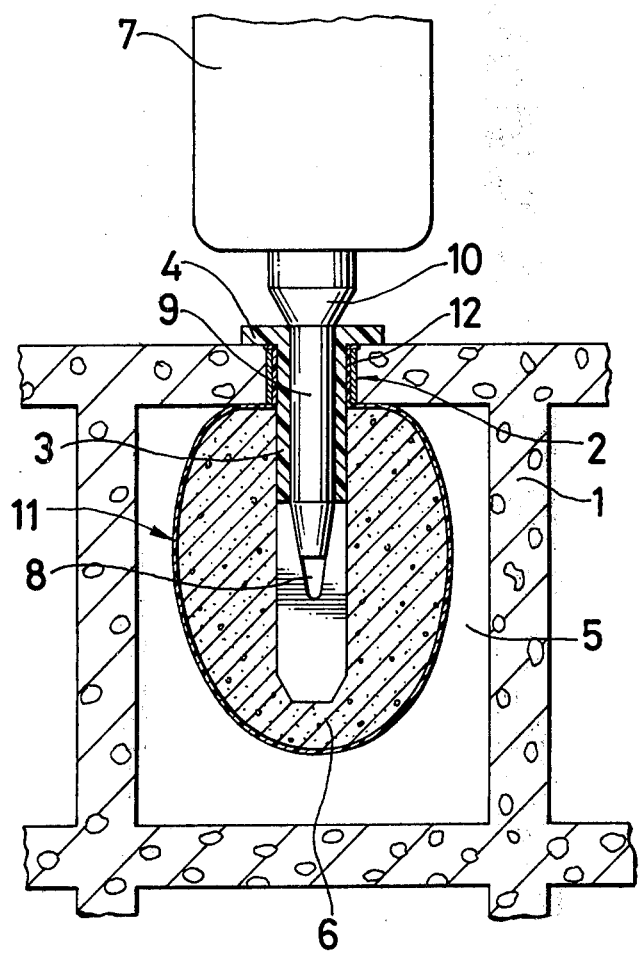

APPARATUS FOR FIXING AN OBJECT TO A LOW-STRENGTH SUPPORT STRUCTURE

CROSS-REFERENCE TO RELATED APPLICATIONS

The present application is a continuation-in-part of the U.S. application having Ser. No. 617,832, filed on Oct. 1, 1975, by the applicant, and having the title "Method and Arrangement for Securing an Object to a Low-Strength Support Structure," which is itself a continuation-in-part of the U.S. application having Ser. No. 616,072, filed on Sept. 23, 1975, by the applicant, and having the title "Method and Arrangement for Mounting an Object to a Low-Strength Support Structure."

BACKGROUND OF THE INVENTION

The present invention relates to a method and an apparatus for fixing an object to a support structure and, more particularly, to the secure mounting of an object to a low-strength support structure, such as a porous masonry wall or a block-like structure having interior hollow cavities.

In general, the prior art has encountered very serious difficulties when it is desired to mount an object, such as a cladding panel, onto a low-strength support structure. Because such structures are typically porous and usually have large vacant cavity areas, they have a very low resistance to fracture and thus do not provide an adequate surface for an object to be securely mounted thereon. In the case where an expansion anchor member is placed in an anchoring hole which is provided in the low-strength support structure and radially expanded, the support structure is especially subject to crumbling. It will be appreciated that when the circumferential wall of such anchoring holes are so destroyed, the clamping force which secures the object to the support structure is no longer sufficient to perform its function. Once destroyed, the anchor hole can no longer be used anymore for mounting purposes.

In porous block-like supporting structures having interior hollow cavities separated by partition walls, it is known to utilize an extra-long dowel whose length is selected so that it can engage and grip several of the partition walls in the interior of the support structure. Such oversized dowels usually have spreadable elements which are adapted to engage a large area at the rear sides of the partition walls. Thus, as a result of distributing the expansion pressure force over several partition walls, a large extraction force is required to remove an object from the support. However, even with this prior-art approach, one still subjects the interior of the structure to some crumbling. Moreover, the higher anchoring values frequently necessary to mount a heavy object on a support cannot always be achieved. Finally, not only are the spreadable elements costly to manufacture, but this approach cannot be successfully used when the support structure is relatively thin.

In other porous material structures, the prior art teaches the use of adhesives to improve the holding strength or retention of the anchoring member. However, the retention properties of the dowel are limited by the low breaking strength of the masonry material and, moreover, the adhesive technique cannot be effectively used for block-type walls having interior cavities.

It is also known in the prior art to mortar or cement dowels in place in an anchoring hole provided in masonry. Such an anchoring hole has a cross-section which is considerably larger than the cross-sectional measurement of the dowel or anchoring member. Thereupon, the anchoring hole is filled with a cement-like mixture, and then the dowel is inserted into this mixture. In order to ensure that the dowel is correctly positioned in the hole, it is however necessary to support and hold the dowel therein until the mixture sets.

This prior-art method has the drawback that it requires a considerable amount of time. It will be appreciated that, in many applications where a great plurality of these dowels are required to be installed, that the loss of time and the additional labor expenses are very considerable. Furthermore, this prior-art cementing technique cannot utilize expansion anchor devices since their leading end faces must be closed so that they can be pressed into the cement mixture.

For all of the above considerations, the only time that dowels are generally cemented into walls is in the mass-production of pre-fabricated concrete parts. In this mode of production, the dowels are positioned in place by means of spikes or pins which are pre-arranged on slabs. The pins are positioned into the respective inner passages of the dowels and thereby hold the dowels in place until the cement has hardened. This approach, as the others described above, has the disadvantage of requiring additions holding elements.

Finally, in the aforementioned parent application having Ser. No. 617,832, the applicant has proposed mounting an object to a support structure by inserting an anchor member into an anchoring hole and injecting a hardenable substance through an interior passage of the anchor member and from there to the exterior of the latter so as to fix the anchor member in the hole upon the curing of the hardenable substance.

Although this approach is generally effective in accomplishing its intended purpose, difficulties have arisen. First of all, the hardenable substance takes a long amount of time to cure properly. Thus, before mounting an object to the support structure, one is required to wait for a considerable amount of time to elapse. In addition, the interior hollow cavities of the block-like support structure have generally been completely filled with the hardenable substance. This is particularly expensive and wasteful when the the structure has very large cavities.

In order to overcome the necessity for completely filling the hollow interior cavities of the support structure, the applicant has further proposed the use of quick-setting substances which cure almost as soon as they reach the exterior of the anchor member. The rapid setting of such substances tends to partially fill a cavity. However, it has proved to be very difficult to control the amount of such curable substances required for a particular application. The high cost of such substances and the lack of any accurate prediction as to the exact amount required results in increased costs and a wastage of material.

SUMMARY OF THE INVENTION

Accordingly, it is a general object of the present invention to overcome the disadvantages of the prior art.

More particularly, it is an object of the present invention to provide a method and an apparatus for fixedly securing dowels, i.e. anchor members, to a low-strength support structure.

An additional object of the present invention is to provide a method and an apparatus for fixedly securing an object to a low-strength support structure without subjecting the support structure to crumbling.

Still a further object of the present invention is to quickly fix dowels in position so that one is not required to wait for long periods of time for a hardenable substance to cure.

Yet another object of the present invention is to provide an anchor member which is utilizable for sealing the anchoring hole of a low-strength support structure against outflow of a hardenable substance.

Yet a further object of the present invention is to eliminate the necessity for completely filling the hollow interior cavities of a block-like supporting structure.

An additional object of the present invention is to effect a cost savings in the amount of the hardenable substance required.

Another object of the present invention is to limit the amount of hardenable substance required to a predetermined value.

In keeping with these objects and others which will become apparent hereinafter, one feature of the invention is embodied in providing an anchoring hole in a support structure; positioning an expandable element having an interior space about an anchor member so as to at least in part surround the same, and inserting the anchor member and the expandable element into the anchoring hole. The expandable element has a closed end which encloses a leading end of the anchor member, and the latter has an internal passage which extends from its leading end towards its trailing end and which communicates with the interior space of the expandable element. A device is mounted into the passage of the anchor member for injecting a hardenable substance into the passage and from there into the interior space of the expandable element so that a predetermined amount of the hardenable substance fills the interior space and forms a plug about the anchor member, and thereby prevents withdrawal of the anchor member from the anchor hole upon the hardening of the hardenable substance.

This feature overcomes the prior art drawbacks and achieves the aforementioned objectives in a novel manner. By mounting an expandable element about the leading end of the internal passage, the amount of hardenable substance actually used will remain substantially constant. Moreover, since the interior space limits the total amount of hardenable substance which can be injected therein, a substantial savings both in cost and material is effectively realized.

Of course, the hardenable substance may comprise any cement-like composition or any quick-setting substance, such as a foamable plastics material like polyurethane.

The use of the expandable element substantially increases the breaking strength of the inner circumferential wall of the anchoring hole in the low-strength support structure and obviates the necessity for completely filling the entire interior of a cavity of a block-like support structure. The filled expandable element serves as an abutting surface for engaging the rear sides of the partition walls of the support and thus requires one to exert a large extraction force in order to remove an object from the support.

Another feature of the invention is embodied in providing a flange portion at the trailing end of the anchor member. One function of the flange portion is to cover the anchoring hole and to serve as a seal against outflow of the hardenable substance. Another function of the flange portion is to serve as an abutment surface for a shoulder of the injection device. Consequently, the degree of insertion of the injection device into the interior passage of the anchor member is easily controlled. It is desirable to place the outlet nozzle of the injection device in the forward region of the anchor member so that the hardenable substance can be conducted through the open front end of the anchor member, either by a slot or a slit in its end face, or through a split in the side walls of the anchor member, to fill up the interior space of the expandable element.

Still another feature of the injection device is that the cross-section of its outlet nozzle is substantially equal to or slightly less than the cross-sectional dimension of the internal passage within the anchor member. This feature ensures that the passage remains empty after the hardenable substance has been injected and the injection device removed. Thus, a mounting screw can be screwed into this passage even after the hardenable substance has set.

A further feature of the invention is embodied in preventing the expandable element from becoming detached from the anchor member, especially during the time when the hardenable substance is being injected under pressure towards the closed end of the expandable element. A sleeve member is provided to tightly engage the open end of the expandable element and firmly secure the latter to the anchor member.

An additional feature of the invention is embodied in bending the trailing end of the expandable element over the sleeve member so as to form an annular flange which aids in preventing the expandable element from sliding off the anchor member, particularly during the injection process.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

The single FIGURE is a partially-broken, partially-sectioned side view of an exemplary embodiment according to the present invention.

DESCRIPTION OF THE PREFERRED EMBODIMENT

Referring jointly to the method and the apparatus for fixedly mounting an object to a low-strength supporting structure using a dowel or expansion anchor, it will be seen that, in the single FIGURE, reference numeral 1 identifies an aerated, porous wall block having internal cavities 5 separated by partition walls. Although the present invention will be discussed with reference to such porous walls, it will be appreciated that the present invention is not intended to be limited thereby and can, in fact, be utilized with any low-strength support structure which has interior hollow areas and which as a relatively low resistance to crumbling when force is applied thereto.

Referring again to the single FIGURE, an anchoring hole 2 is provided in block 1 by boring or a similar drilling operation. An anchor member or dowel 3 has a sleeve portion which is insertable into the hole 2 and which has a cross-section which is slightly less than the cross-section of the hole 2 so that a very slight clearance is defined.

Prior to the insertion of the anchor member 3, an expandable element 11 is mounted about the trailing end of the anchor member 3 so as to at least in part surround the same. The expandable element 11 has a hollow interior space which is to be filled with a hardenable substance, as will be explained later herein. The expandable element 11 further comprises an open end which permits the element 11 to be slid over the trailing end of the anchor member 3, and a closed end which encloses the leading end of the anchor member 3.

The anchor member 3 bounds an internal bore or passage 8 which extends from its leading end towards its trailing end and which communicates via slot 3a in member 3 with the interior space of the expandable element 11. The cross-section of the passage is substantially equal to or slightly less than the cross-section of a nozzle 9 of an injection device 7. Details of the injection device can be had by reference to applicant's aforementioned parent application, U.S. application Ser. No. 617,832, the entire contents of which are hereby incorporated by reference.

The device 7 is operative for injecting a hardenable substance or filler 6, under pressure, into the passage 8 towards its leading end from the interior to the exterior of the anchor member 3. The hardenable substance 6 can be any settable composition, such as a cement-like mixture, or any more rapid setting composition, such as a foamable plastics material like polyurethane which is comprised of at least two component elements.

The anchor member 3 also has a flange portion 4 at its trailing end to act as an abutment surface for the shoulder or conically-shaped collar 10 of the device. Thus, the extent of insertion of the nozzle 9 towards the leading end of the passage is controlled. In addition, the flange portion 4 covers the hole 2 and seals the same against outflow of any of the substance 6 which is still in the fluid state.

Thus, in operation, the anchor member 3 and the expandable element 11 are inserted into the hole 2 as far as the flange portion 4 will permit. The expandable element 11 has an empty interior at this time so that it can easily fit through the hole 2 in its collapsed state. The leading end of the passage 8 of the anchor member 3 is open to conduct the substance 6 to the immediate exterior of the anchor member 3, i.e. the interior space of the element 11, by means of either a slot or slit in its end face at its leading end, or by means of a split in the side walls of the sleeve portion.

Next, the nozzle 9 of the device 7 is inserted into the interior passage 8 until its houlder 10 abuts against the flange portion 4 and is operative, as noted above, for spraying the hardenable substance 6, under pressure, from the interior and thereupon to the immediate exterior of the anchor member 3 so that the hardenable substances 6 will encase the anchor member 3 and form a plug or sheath thereabout upon the setting of the substance 6. During the pressurized injection the collapsed expandable element 11 will fill up. If the expandable element 11 is comprised of flexible, resilient walls, such as rubber, then the element 11 will blow up in the manner of a balloon. Of course, it will be appreciated that the element 11 may be comprised of other material, such as synthetic plastic material or cloth fabric, such as a canvas bag, just to mention a few possibilities.

The use of the element 11 assures that only a predetermined amount of the substance 6 is needed. No longer is the necessity required for filling up the entire area of the cavity 5 which is especially undesirable when large interior cavities are present in the structure 1.

At this point, the injection device 7 is removed, and the passage 8 will be substantially free of any substance 6, because the dimensions of the nozzle, as previously explained, prevents the substance 6 from flowing into the passage 8. A screw, non-illustrated, can now be screwed into the passage 8 to mount an object such as, a panel, to the support structure 1.

In order to prevent the element 11 from becoming detached from the anchor member 3, especially when the injection device 7 is exerting a force against the closed end of the element 11 during the injection process, a sleeve member 12 is provided. The sleeve 12 is cylindrical and tightly fits over the trailing open end of the element 11 which is, in turn, mounted over the trailing end of the anchor member 3. Thus, the diameter of the hole 2 should be so dimensioned so as to accommodate the entire assembly which comprises the sleeve 12, element 11 and anchor member 3.

The length of the sleeve 12 should approximately correspond to the width of a partition wall of the support structure 1. Thus, this feature not only permits the anchor member 3 to be adequately fixed in the hole 2 but also permits the element 11 to be protected from breaking in the region of the partition wall.

In order to even further prevent the element 11 from becoming detached from the anchor member 3, the trailing open end of the element 11 can be bent outwardly over the sleeve 12. An annular flange is thereby created intermediate the flange portion 4 and the trailing end face of the sleeve 12 which prevents the element 11 from sliding off the anchor member 3.

With the teaching of the present invention, the extraction values for the anchor member after the substance has hardened is vastly superior to the withdrawal values of the prior art fixing elements used until now for aerated cement. The problem of slippage of the anchoring members of the prior art has been substantially eliminated. By expanding the anchor member, a very good anchorage is obtained without causing the material of the low-strength support structure to crumble.

It will be understood that each of the elements described above, or two or more together, may also find a useful application in other types of constructions differing from the types described above.

While the invention has been illustrated and described as embodied in a method and apparatus for fixing an object to a low-strength support structure, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific objects of this invention.

What is claimed as new and desired to be protected by Letters Patent is set forth in the appended claims:

1. An apparatus for mounting an object to a low-strength support structure having an anchoring hole, comprising an elongated anchor member insertable in said anchoring hole and having an open leading end and an open trailing end provided with an integral abutment flange, said anchor member having a slot extending from said leading end towards said trailing end, said anchor member also having a body portion bounding a single integral passage which extends through said flange from said open leading end towards said open trailing end and which communicates via said slot with the exterior of said anchor member; an expandable element positioned about said anchor member so as to at least in part surround the same, said expandable element having a closed end bounding an interior space which encloses said open leading end of said anchor member and communicates via said slot with said internal passage; a plug surrounding said anchor member and filling said interior space, said plug being constituted of a hardenable substance injected by an injection device through said open trailing end into said internal passage and from there via said slot into said interior space, whereby a predetermined amount of said hardenable substance is admitted into said interior space and prevents withdrawal of said anchor member from said hole upon the hardening of said substance.

2. An apparatus as defined in claim 1, wherein said expandable element is comprised of flexible, resilient material.

3. An apparatus as defined in claim 1, wherein said flange portion and said body portion are synthetic plastic.

4. An apparatus as defined in claim 1, wherein said anchor member is formed of synthetic plastic material.

5. An apparatus as defined in claim 1, wherein said expandable element has an open end mounted about said anchor member; and further comprising a sleeve member mounted about said open end of said expandable element so as to prevent the same from becoming detached from said anchor member.

6. An apparatus as defined in claim 5, wherein said open end of said expandable element includes an outwardly-bent lip portion which abuts against an axial end of said sleeve member.

* * * * *